G. C. HUMPHREY.
MATERIAL COMPRESSING MACHINE.
APPLICATION FILED SEPT. 20, 1913.
1,113,121.
Patented Oct. 6, 1914.
8 SHEETS—SHEET 5.
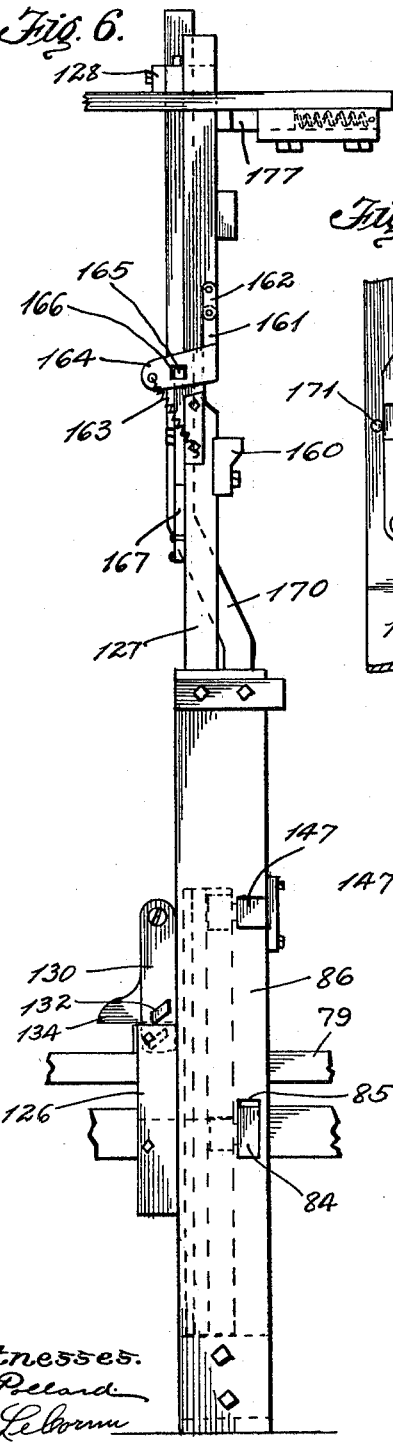
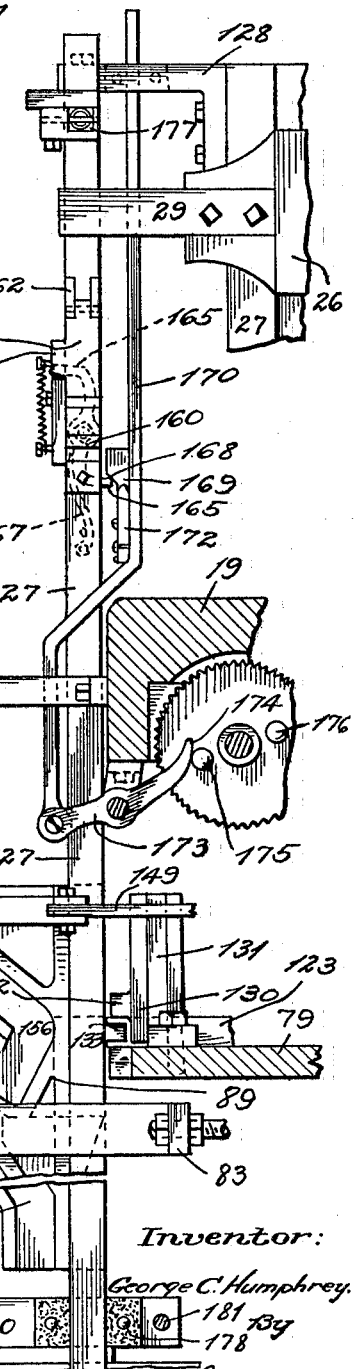
Inventor:
George C. Humphrey.
Cassell Severance
Atty.
Witnesses.

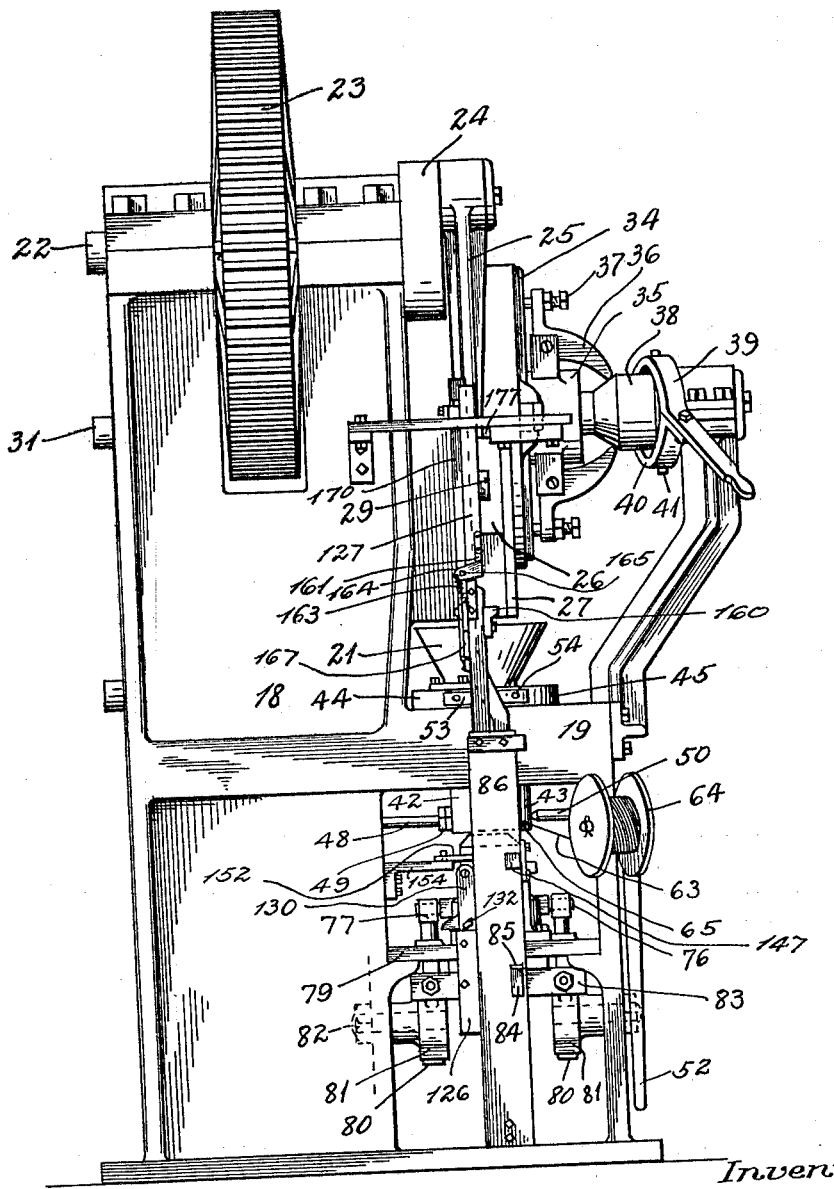

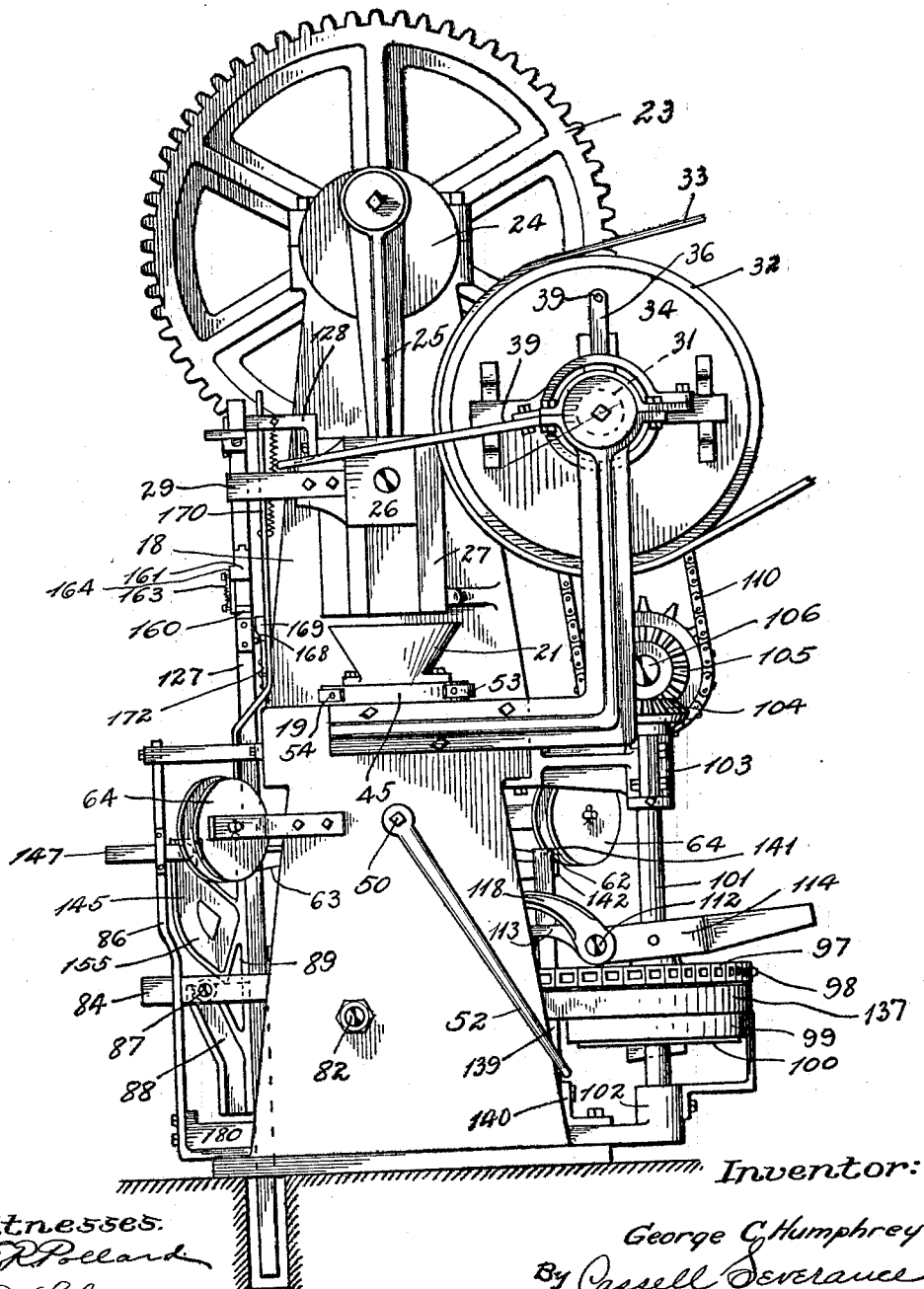

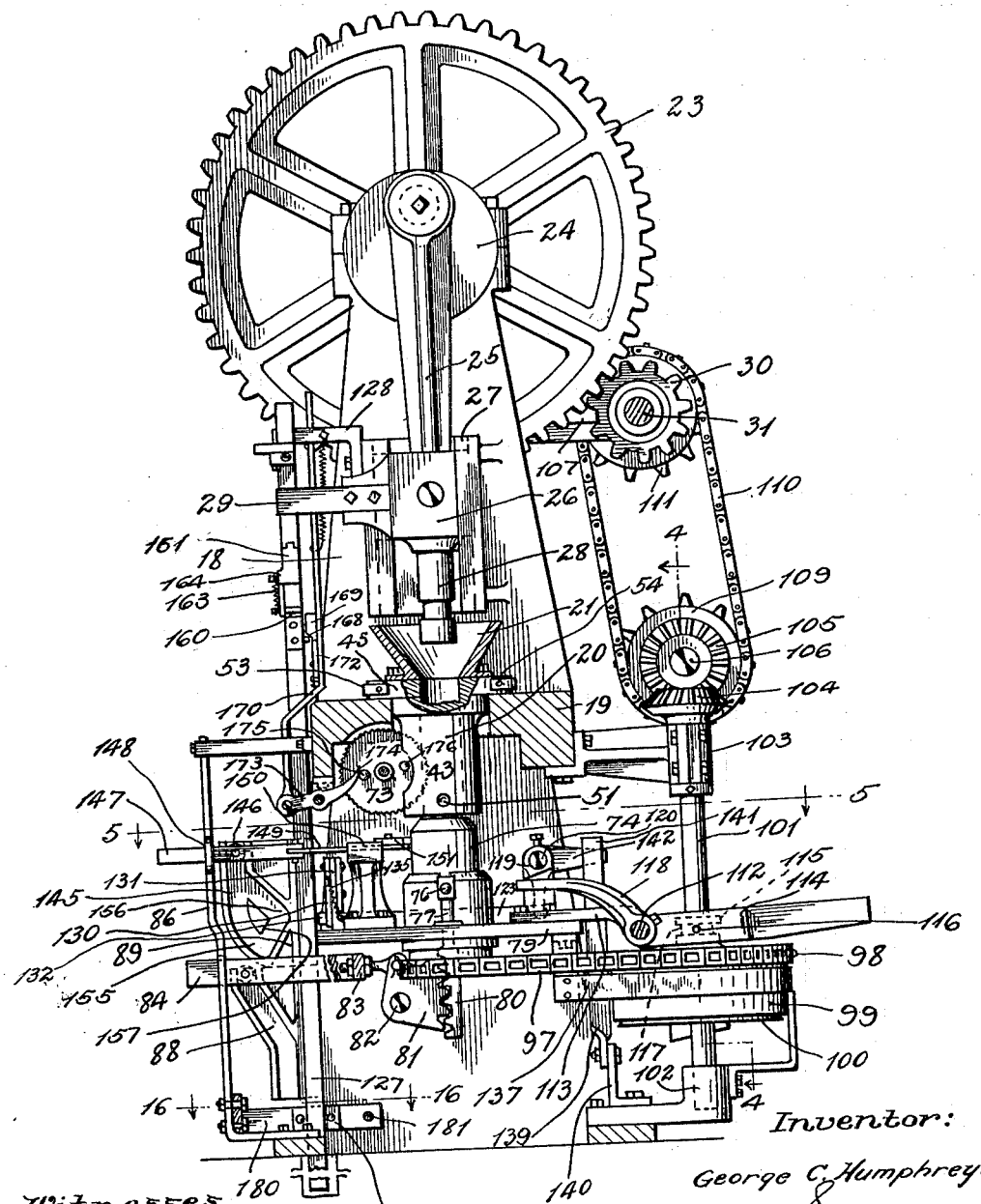

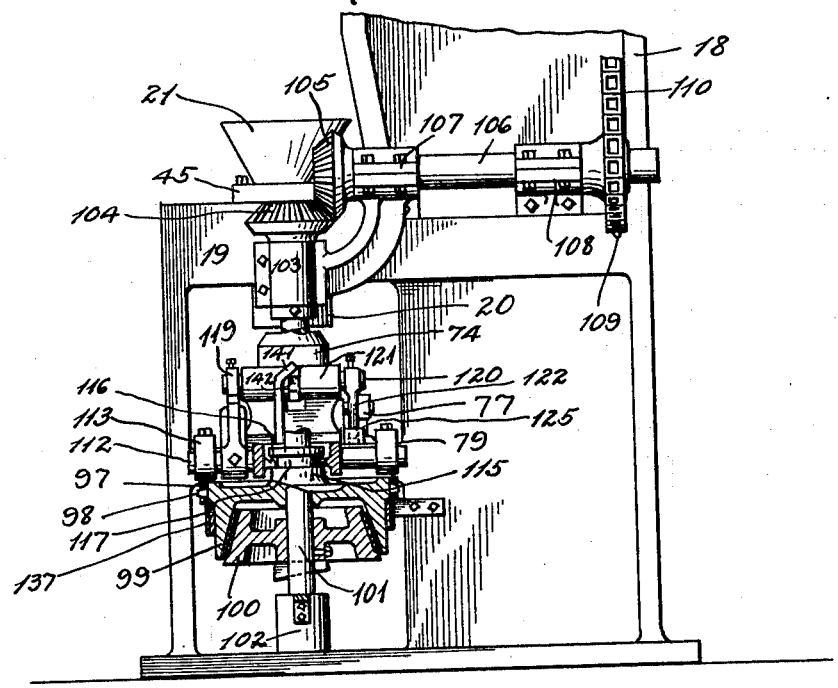
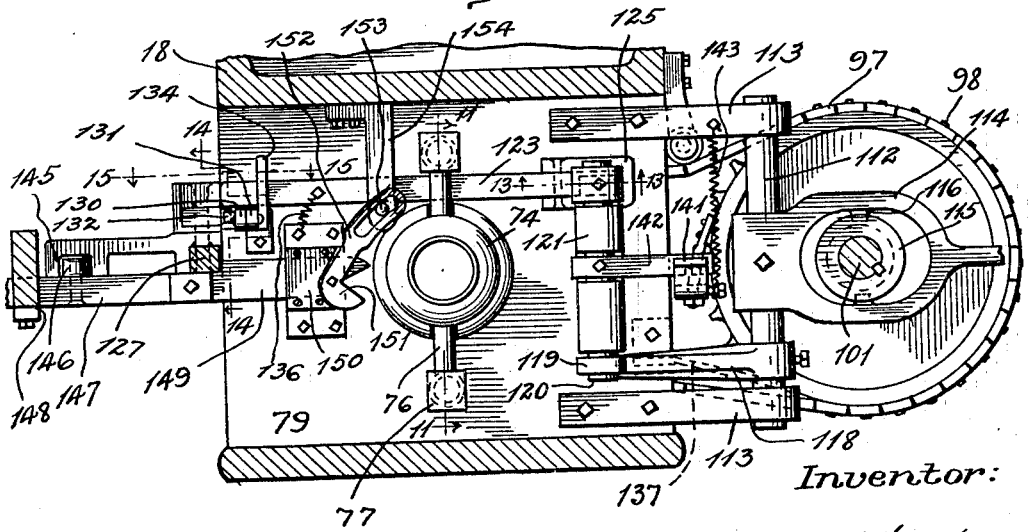

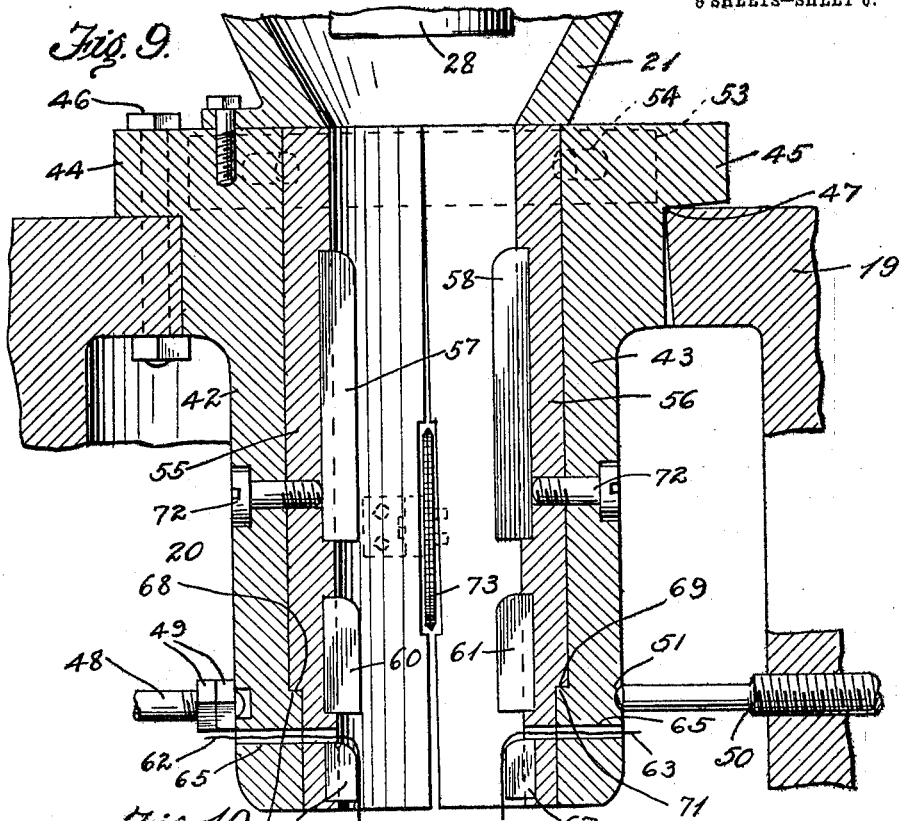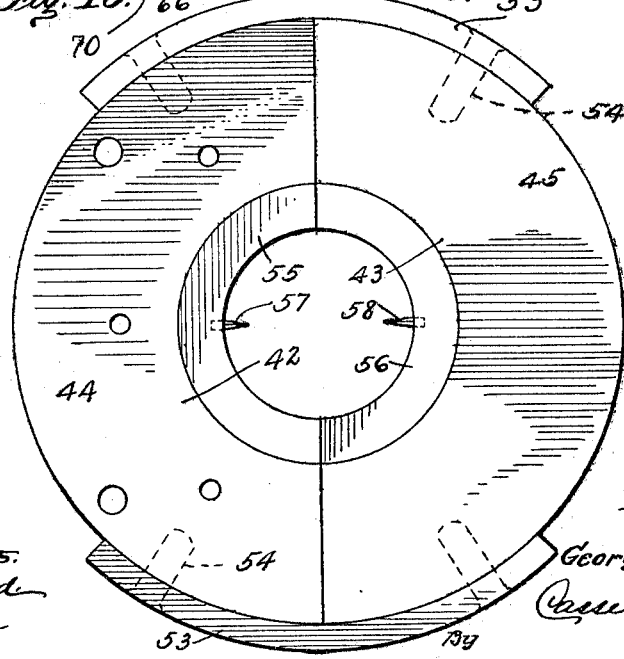

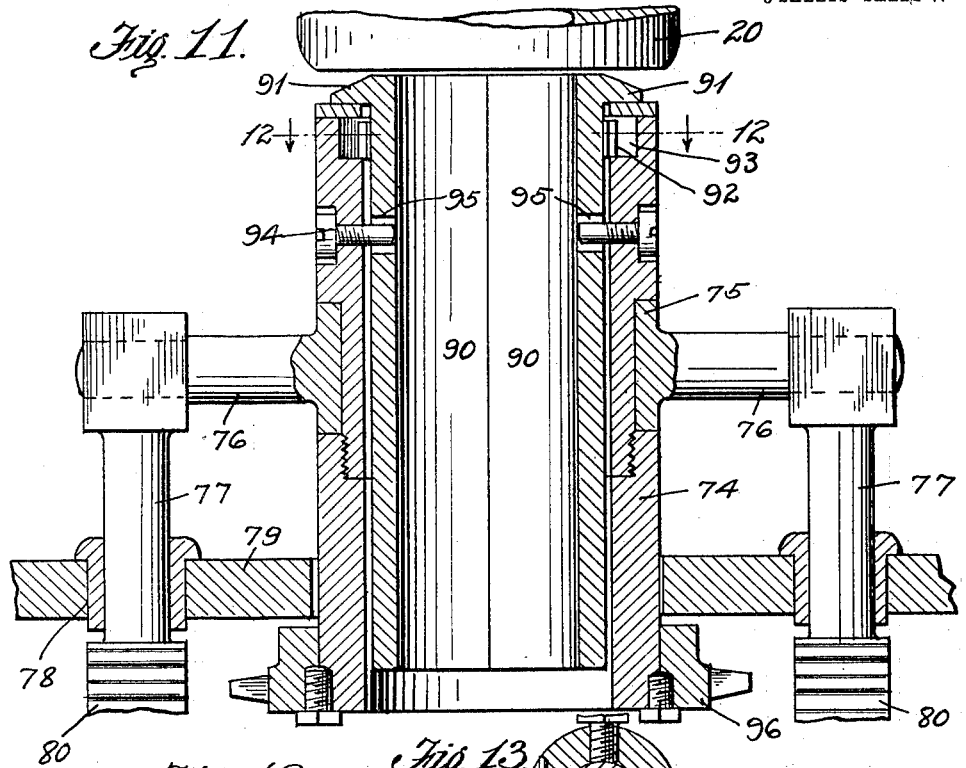

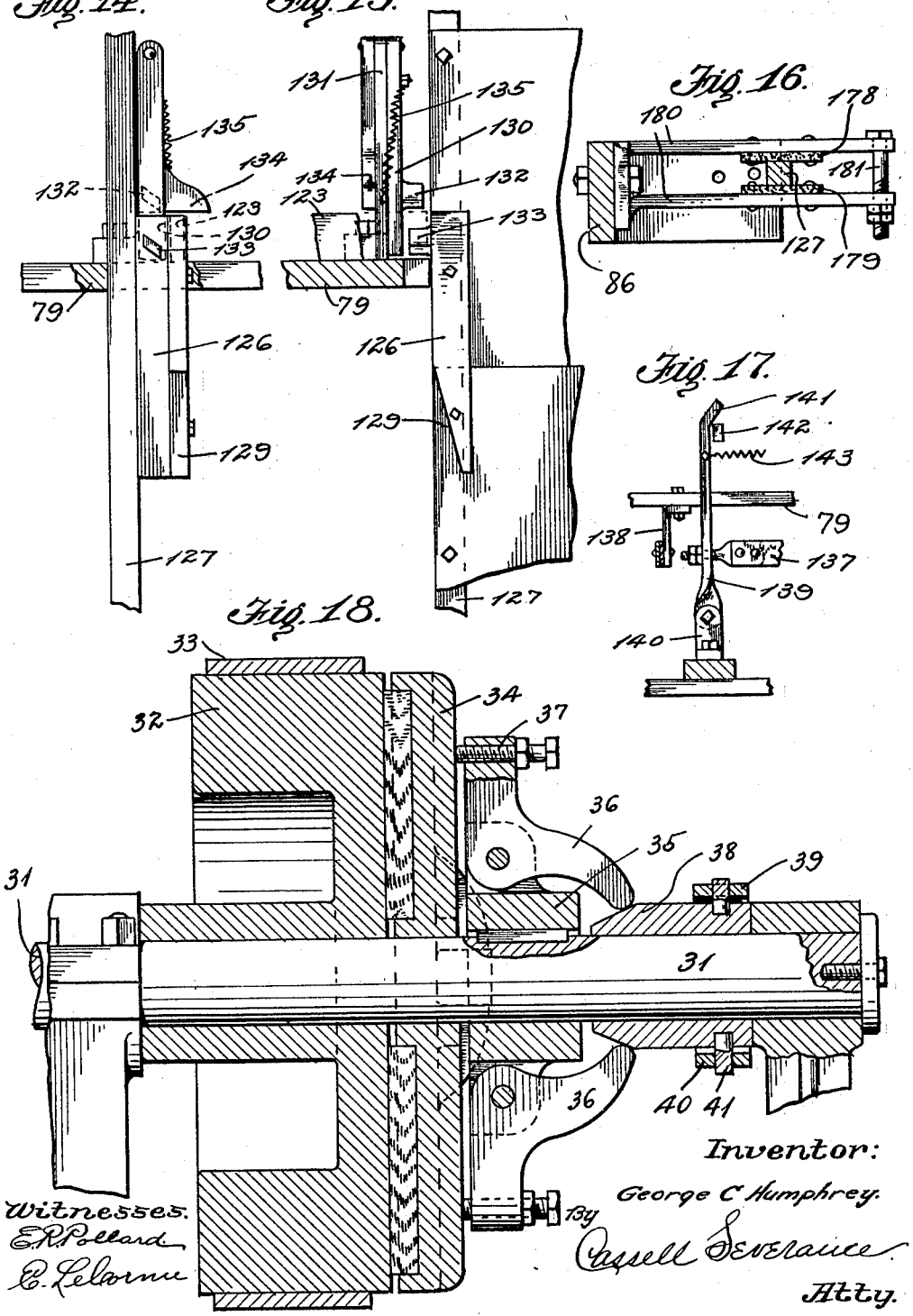

UNITED STATES PATENT OFFICE.

GEORGE C. HUMPHREY, OF LOS ANGELES, CALIFORNIA, ASSIGNOR TO CALIFORNIA FUEL MANUFACTURING COMPANY, OF LOS ANGELES, CALIFORNIA, A CORPORATION OF CALIFORNIA.

MATERIAL-COMPRESSING MACHINE.

1,113,121. Specification of Letters Patent. Patented Oct. 6, 1914.

Application filed September 20, 1913. Serial No. 790,899.

*To all whom it may concern:*

Be it known that I, GEORGE C. HUMPHREY, a citizen of the United States, residing at Los Angeles, in the county of Los Angeles and State of California, have invented certain new and useful Improvements in Material-Compressing Machines, of which the following is a specification.

This invention relates to improvements in material compressing machines and has particular relation to that class of machines adapted for receiving materials in more or less comminuted form and small pieces, and tightly compressing and forming the same into a compact body, mass, stick or bar, the compressed composite piece, or stick, being formed into suitable lengths wrapped and bound by a holding means.

The machine is especially well adapted for the compressing of saw dust, shavings, chips and the like into solid masses or sticks and binding wires about the same.

A machine of this general type has been employed heretofore for such purposes but various means were employed for accomplishing the different steps in treating the compressed material, making a complex mechanism of the machine.

It is an object of the present invention, among other things, to provide a machine of this general character, in which, however, the compressed material may be separated into suitable lengths, twisted for fastening a wire about the same and have the wire cut, through the instrumentality of one member, which is operable in conjunction with the plunger which compresses the materials.

It is, also, a further object of the invention to provide such a device in which a single cam member may be used and formed with cam surfaces adapted to actuate the various parts of the mechanism after the material has been compressed into a composite piece or stick of a desired length.

With these and other objects in view the invention comprises certain novel constructions, combinations and arrangements of parts as will be hereinafter fully described.

In the accompanying drawing, forming a part of this specification, Figure 1 is a front elevation of a machine constructed in accordance with this invention. Fig. 2 is a side elevation of the said machine. Fig. 3 is a view partially in elevation and partially in section, illustrating the construction of the material receiving hopper, the die in which the material is compressed and mechanism for separating the same, twisting the wires and cutting the same. Fig. 4 is a detail sectional view taken upon the line 4—4 of Fig. 3. Fig. 5 is a horizontal detail sectional view taken upon the line 5—5 of Fig. 3. Fig. 6 is a front edge elevation of the cam member employed in accomplishing many of the operations of the machine, adjacent parts being broken away, the device being shown upon an enlarged scale. Fig. 7 is a side elevation of said cam member and its adjacent parts upon the same scale, portions of the machine being broken away and shown in section. Fig. 8 is a fragmentary detail view of a spring pressed cam block for releasing the parts which connect the cam member of the machine with the compressing plunger. Fig. 9 is an enlarged central sectional view taken longitudinally through the forming die of the machine. Fig. 10 is a top plan view of the said die. Fig. 11 is a vertical sectional view through the twisting member taken upon the line 11—11 of Fig. 5 and showing the device upon an enlarged scale. Fig. 12 is a detail sectional view taken upon the line 12—12 of Fig. 11. Fig. 12 is a fragmentary detail sectional view upon an enlarged scale taken upon the line 13—13 of Fig. 5. Fig. 14 is a fragmentary detail view taken upon the line 14—14 of Fig. 5. Fig. 15 is a similar detail view taken upon the line 15—15 of Fig. 5. Fig. 16 is a detail sectional view taken upon the line 16—16 of Fig. 3. Fig. 17 is a fragmentary detail view showing the lever employed for operating the brake band of the machine. Fig. 18 is an enlarged central sectional view through the clutch employed on the drive shaft of the machine. Fig. 19 is a detail perspective view of a composite stick produced in the machine and secured with a wire binder. Fig. 20 is a detail sectional view through the adjacent ends of the forming die and twisting member showing the cutting knife in position for severing the wire.

The details and features of the invention will now be specifically described reference being had to the accompanying drawing in which 18 indicates the frame of the machine, which is provided with a platform 19 adapted to carry the forming die 20 and the receiving hopper 21 of the compressing mechanism. The upper portion of the frame 18 extends considerably above the platform 19 and has bearings therein for a shaft 22, which carries a gear wheel 23 and a crank disk 24. The said crank disk 24 is provided with a wrist pin which engages a pitman 25 for operating it as the shaft 22 is rotated by the gear 23. The lower end of the pitman 25 is connected with a plunger cross head 26, which moves in guides 27 upon the frame 18. The said cross head 26 carries a compressing plunger 28, which is adapted to force the materials to be compressed, into the hopper 21 and the die member 20. The said cross head 26 also carries a laterally projecting arm 29, which is arranged to operate the moving member, which coöperates with the plunger and causes the manipulation of the composite piece or stick formed in the die after the material passes out of the die. The gear 23 is generally driven by means of a pinion 30 meshing therewith and carried by a transverse power shaft 31, which is carried by suitable bearings mounted upon the frame 18. A pulley 32 is secured to said shaft 31 for driving the same and may be connected by belting 33 with any suitable source of power not illustrated. The pulley 32 preferably runs freely upon the shaft 31 and may be connected therewith when the machine is to be operated by the manipulation of a clutch, preferably such as is illustrated upon an enlarged scale in Fig. 18 of the drawing. Such clutch usually comprises a friction disk 34 adapted to bear upon one side of the pulley 32. The said disk is splined to the shaft 31 as is also an adjacent collar 35 which carries clutch operating levers 36. The outer ends of the levers 36 have adjustable screws 37 for bearing against the disk 34 while their inner ends approach the shaft 31 and are adapted to be separated by a cone sleeve 38 loosely mounted upon the shaft 31. A hand lever 39 pivoted upon the frame and having a yoke portion 40 engaging studs 41 carried by the said collar 38 is provided for operating said cone. It will be readily understood that when the lever 39 is moved so as to cause the cone 38 to operate the levers 36, the friction disk 34 will be caused to press tightly against the pulley 32 whereby the said disk will be turned with the pulley and its movement will be imparted to the shaft 31.

The platform 19 is formed with an opening therein for receiving the die member 20. Said die member is preferably made up of two approximately semicylindrical sections 42 and 43 the upper ends of which are formed with over-hanging flanges 44 and 45 which rest upon the upper surface of the platform 19. The die section 42 is preferably rigidly held in position and may be secured to the platform 19 by one or more bolts 46. The opposite section 43 of the die is preferably made to rock slightly upon the edge 47 formed upon the platform 19. The opening in the platform is cut back to a slight extent from the upper edge 47 and the under side of the flange 45 is slightly beveled, as clearly shown in Fig. 9, to permit of the slight rocking action which is sometimes needed in the said die section 43. Such need arises when the materials compressed become too tightly wedged within the die and the slight separation of the die sections, caused by the rocking of the section 43, will relieve the tightness and permit the materials to be forced on through the die. The lower ends of the die sections are properly supported, the section 42 resting against an abutment bolt 48 carried by the frame 18. The said bolt carries abutment nuts 49 which may be adjusted to bear against the end of the section 42 and thus give it positive support. The lower end of the opposite die section 43 preferably rests against an adjustable abutment bolt 50, the inner end of which engages a slight socket 51 made in the die section 43. The outer end of said bolt is provided with a hand lever 52, by which the bolt may be turned upon its threads for easing up upon the section 43 when there is danger of the materials compressed sticking within the die. The upper flanged ends of the die sections 42 and 43 are movably connected by curved strips 53 bent to fit upon the peripheral portions of said flanges and having studs 54 projecting into holes formed into edges of the flanges 44 and 45. Such connection is found to be sufficiently firm to hold the die sections at the top and yet permit of the rocking of the member 43 for operating the lower portions of the die.

The die sections are preferably formed with lining sections 55 and 56, the inner surfaces of which form a cylindrical passage just large enough to receive the plunger 28. The hopper 21 is mounted upon the upper ends of the die sections 42 and 43 and the contracted end thereof is made to just fit over the opening in the die lining sections 55 and 56.

As the loose materials, which are to be compressed, are continually driven into the die they will be formed and compressed into a continuous stick within said die, which is forced downwardly through said die as new material is compressed at the top by each reciprocation of the plunger 28. The materials forming this stick are preferably bound together by binding wires so that in the case of sawdust, shavings, etc., compressed to form a proper fuel, the small particles will not be likely to work loose or become separated before it is desirable. In placing a binding means around a stick of such loose material, also, it is found that unless the binding means or wire is thoroughly embedded within the stick that the shavings will quickly curl outwardly from beneath the wire when placed in a fire and will thus permit of a too rapid disintegration for the formation of a good fuel. To obviate this difficulty the die is provided with knife pieces 57 and 58 mounted opposite each other in slots formed upon the inner surfaces of the lining sections 55 and 56. As the material is forced through the die the knife pieces will form deep kerfs in the opposite sides of the stick as indicated at 59 in Fig. 19. Auxiliary shorter knife pieces 60 and 61 are, also, preferably provided within the die and in alinement with the knife pieces 57 and 58, said auxiliary pieces keeping the kerfs open for the reception of binding wires 62 and 63. Said binding wires enter the die passing from spools 64 through openings 65 formed in the walls of the die sections and are forced into the kerfs 59 in the composite stick of material by small knife pieces 66 and 67 carried near the lower end of the die sections. Said latter knife pieces preferably do not extend into the die quite as far as the other knife sections above and their inner edges are made more blunt and at least as wide as the wires 62 and 63 so as to properly press them into place in the kerfs of the completed stick, as will be readily understood by reference to Fig. 9 of the drawing. In order to prevent the lining sections 55 from slipping downwardly, they are provided with shoulders 68 and 69, which engage interior shoulders 70 and 71 formed near the lower ends of the die sections. Cap screws 72 are, also, passed through the walls of the die sections and the lining sections to prevent the sections from turning with respect to each other.

The fixed die section 42 has journaled thereon, a wheel 73, the periphery of which is provided with sharp serrations adapted to engage the composite stick of material passing through the die, said wheel being thus turned and utilized as hereinafter described for causing the further operations upon the said stick when the said stick has attained a given length. The adjacent meeting edges of the die sections are slightly cut away to accommodate the said serrated wheel 73, as shown in Fig. 9.

Below the die is located mechanism for receiving the stick of material compressed, for breaking it off in suitable lengths, twisting and securing the binding wires and for cutting off the said binding wires after they are twisted. It is an important feature of the present invention that these operations are accomplished through the agency of a single movable member controlled by the cross head of the machine and such feature constitutes one of the novel parts of this invention.

Located below the die mechanism is a mechanism for separating the sticks of material compressed into proper lengths and for twisting the binding wire thereon. This mechanism is made up of an outer cylinder 74, which has a bearing in a collar 75 engaging the said cylinder at a point near the longitudinal center thereof. The said collar 75 is provided with laterally projecting trunnions 76, the ends of which are reduced and mounted in bearings formed in the upper ends of standards 77. The standards 77 pass through bearings 78 in a platform 79 which is formed in the frame below the platform 19. The lower ends of the standards 77 are provided with racks 80 having rack teeth adapted to engage and mesh with the teeth of rocking segments 81. Each of the segments 81 are journaled upon supporting pivot bolts 82, which are secured to adjacent upright portions of the frame 18, as clearly shown in Fig. 1 of the drawing. The upper corners of both the segments 81 are pivotally connected to a cross bar 83 and a thrust bar 84 rigidly connected with said cross bar 83 projects outwardly at right angles thereto and engages a guide slot or bearing 85 formed in a guide plate 86, which is mounted upon the front of the machine. The said thrust bar 84 has a laterally projecting pin 87 carrying an antifriction roller, said roller being adapted to engage and move in a cam path 88 formed in a cam member 89. The said cam member 89 moves vertically in suitable guide ways upon the front of the machine and the thrust bar 84 is thus moved at suitable intervals for rocking the segments 81 and lowering the twisting member as well as for raising it again.

Returning to the twisting member proper, the outer cylinder 74 has mounted within it the semi-cylindrical sections 90 having supporting flanges 91 at their upper edges. The said sections do not quite fill the interior of the cylinder 74 and may thus be slightly spread when the stick of compressed material is forced through them. C-springs 92 are mounted in annular recesses 93 formed in the upper end of the cylinder 74 and have their free ends bearing upon the sections 90 so as to tend to force them toward each other with a yielding pressure, as will be clearly understood with reference to Figs. 11 and 12 of the drawing. The sections 90 are prevented from turning with respect to the cylinder 74 by means of lug screws 94 carried by said cylinder and projecting at their inner ends in the apertures 95 formed in the walls of the sections 90.

In order to turn the twisting member within the supporting yoke 75 a sprocket ring 96 is rigidly secured to the lower end of the cylinder 74. Said sprocket ring is engaged by a sprocket chain 97, which also engages sprocket teeth 98 formed upon a clutch cup member 99. The cup member 99 is normally supported above and out of engagement with a clutch cone 100, which is rigidly secured to a vertical shaft 101 journaled in bearings 102 and 103, which project from the frame 18. The shaft 101 is kept in continuous rotation when the machine is in operation, being driven by a beveled gear 104 secured to its upper end and meshing with a beveled gear 105 carried by a horizontal shaft 106. The shaft 106 is mounted in bearings 107 and 108 and has secured to it a sprocket wheel 109 by which it may be turned for rotating the shaft 106. The sprocket wheel 109 is connected by a sprocket chain 110 with a sprocket wheel 111 which is rigidly secured upon the power shaft 31. The clutch cone 100 may thus be kept in continuous rotation and when it is desired to actuate the twisting member it is only necessary to lower the clutch cup member 99 so as to engage said cone.

The raising and lowering of the cup member 99 is under the control of a rock shaft 112, which is supported upon projecting bearing bars 113 mounted upon the platform 79. Said rock shaft is provided with a yoke member 114, which surrounds a hub 115 upon the upper side of the cup 99. The yoke member is provided with inwardly projecting pins 116, which engage an annular groove 117 formed upon said hub 115. When the yoke member 114 is lifted by the rocking of the shaft 112 the cup member 99 will be raised and disengaged from the driving cone 100. When the rock shaft 112 is moved so as to lower the yoke member 114 the cup 99 will be lowered into engagement with the cone 100 and will be turned thereby for rotating the twisting member through the agency of the sprocket chain 97.

The movement of the rock shaft 112 is effected by a lever 118, which projects beneath a cam 119 carried by a second or counter rock shaft 120. The counter rock shaft is mounted in bearings 121, which project outwardly from the platform 79 and the said counter rock shaft is actuated by means of an arm 122 secured to one end thereof and projecting downwardly so as to engage the end of a thrust bar 123, which is movably mounted on said platform 79. The lower end of the arm 122 is usually rounded at 124 and loosely engages an inclosing strip 125, which is fastened upon the end of the thrust bar 123. The forward end of the said thrust bar extends to a point adjacent to the cam member 89 upon the front of the machine and is adapted to be forced inwardly by a cam projection 126 carried by said member. The body portion of the said cam member 89 is preferably composed of a rectangular bar 127, the lower end of which passes through a bearing at the base of the frame 18, while the upper end passes through and is guided by a bearing in a bracket 128 projecting upon the upper part of the machine. The cam projection 126 is secured upon one side of the bar 127 and its lower end is beveled at 129 so that as the bar 127 descends the bevel will engage the front end of the thrust bar 123 and thus force the same inwardly for separating the members of the clutch. In order to permit the said thrust bar to come forwardly again when it is desired to bring the clutch members together, a trip bar 130 is pivotally mounted upon a standard 131, which is secured upon the platform 79, just one side of the thrust bar 123 when occupying its normal position. The trip bar 130 is provided with an inclined cam projection 132, which extends into the path of a correspondingly inclined cam projection 133 carried by a block 126 fastened to the said bar 127 and interposed between the same and the cam projection 126. The arrangement of the parts will be clearly understood by reference to Figs. 14 and 15. The standard 131 has a lateral projecting arm 134, which prevents the rising of the thrust bar 123 from the surface of the platform 79. A spring 135 connected with the trip bar 130 at one end and with the standard 131 at the other end tends to return the said trip bar to its normal depending position. When the bar 127, constituting the body portion of the cam member, is elevated the cam projection 133 will force the cam projection 132 to one side, causing the trip bar 130 to move the adjacent end of the thrust bar 123 laterally and out of engagement with the cam projection 126, thus permitting the yoke member 114 to descend and the clutch cup member to engage the cone, as heretofore described. As soon as the projection 126 rises above the thrust bar 123 a spring 136 will draw the said thrust bar 123 against the base of the standard 131 again so as to be in the path of the cam 129 when it descends.

Coöperating with the mechanism of the clutch is a band brake 137, one end of which is rigidly secured to a bracket 138 fastened to the under side of the platform 79 as clearly shown in Fig. 17. The band brake passes around the outer periphery of the clutch cup member 99 and is adjustably secured to a lever 139. The said lever 139 is pivoted to a standard 140 which rises from the base of the machine and the upper end of said lever is bent to one side at 141, so as to overhang the free end of an arm 142, which is carried by and rigidly secured to the rock shaft 120. A spring 143 connected with the upper portion of said lever 139 and extending to one of the bearing arms 113, normally tends to hold the said lever 139 against the said arm 141. The structure is such that when the free end of the arm 142 is elevated by the rocking of the shaft 120, the bent end 141 of the lever 139 will be forced to one side and the band brake will be tightened about the cup member 99 to stop the revolutions of the same and hold it stationary immediately after the separation of the clutch members. The operation of the band brake and the clutch is thus dependent upon the movement of the thrust bar 123 and the rock shaft 120.

The lowering and turning of the twisting member 74 operates to break off the stick of compressed material at the lower end of the die and to twist the wires 62 and 63 between the broken ends of said stick, as indicated in Fig. 20. While the twisting member and die are thus separated, a cutting device is thrust between the said members and caused to sever the twisted wires, as also indicated in said Fig. 20. The cutting device is made dependent upon the movement of the cam member at the front of the machine and the said cam member is provided with a cam path 145 adapted to engage an anti-friction roller 146 carried by thrust bar 147. The outer end of the said thrust bar engages a guide bearing 148 in the adjacent plate 86 and is connected at its inner end with a cutter blade 149. The cutter blade travels in a guide 150 formed upon a standard mounted on the platform 79 and its inner edge is inclined and beveled to form a cutting edge which coöperates with an adjacent blade 151, which is pivoted to the cutter blade 149. The blade 151 is provided with an arm 152 having a curved slot therein, which engages a pin 153 carried by an arm 154, which is secured to the frame 18. The shape of the arm and the slot and the arrangement of the pin 153 is such that when the blade 149 is thrust inwardly the cutting portions of the blades will be brought together around the wires and be made to cut the same with a shear like action. Since the cutting of the wires is not desired until the stick of compressed material has been broken and separated and the wires have been properly twisted, the cam path 154 is shaped, as shown in Figs. 3 and 7 of the drawing, having a curved portion 155, which carries the anti-friction roller 146 inwardly for a part of its travel and a return path 156 is provided which operates when the cam member descends again to finish the inward stroke of the knife blade and make a quick return thereof to its normal position after the wires have been cut. The curvature of the portion 155 of the cam path is such that the anti-friction roller is carried beneath an inclined projection 157 arranged in the central portion of the cam path. When the cam member descends again the said anti-friction roller will thus be engaged by said inclined projection 157 and forced inwardly thereby.

The movement of the cam member is made dependent upon the connection of the bar 127 with the compressing plunger of the machine. The arm 29 moves so that its outer end travels to one side of said bar 127 and an abutment piece 160 is secured to the side of said bar projection into the path of said arm 29 whereby the arm will depress or force downwardly the cam member to the desired distance. The cam member will, however, remain in said depressed position and will not rise with the arm 29 again until a trip plate 161, which is movably connected with the bar 127 by pivoted links 162, is thrown outwardly above the said arm 29. Said trip piece 161 lies in a recess in the side of the bar 127, so that the arm 29 may pass the same, until the desired length of composite stick has been formed by the plunger. A spring 163, connected with a flange 164 of the trip piece 161 and fastened, also, to the arm 127, normally tends to force the trip piece into arm engaging position. Such action is normally prevented, however, by a latch member 165. Said latch member is pivoted upon one side of the bar 127 and has one end turned outwardly so as to be capable of engaging a recess or hole 166 formed in the flange 164. A spring 167 normally keeps the latch in engagement with said hole. The lower end of the latch is turned in the opposite direction so as to be engaged by the inclined surface 168 of a cam block 169, which is pivoted upon a trip rod 170. Said cam block is limited in its movement in one direction by a pin 171 and is normally held against said pin under yielding pressure by means of a spring 172 carried by said trip rod 170. The upper end of the trip rod 170 is adapted to slide in a guide bearing formed upon the bracket 128 while the lower end of said trip rod is pivotally connected with one end of a trip lever 173. Said trip lever is pivoted upon the platform 19 in such a position that its inner curved end 174 will lap upon one edge of the serrated wheel 73 hereinbefore described and set forth as adapted to engage the composite stick of compressed material. The said serrated wheel 73 is provided with projecting pins 175 and 176 extending from one of its faces. As the wheel 73 is turned by the downwardly forced compressed material in the die, the pins 175 and 176 will successively engage the trip lever 173. Thus when the desired length of stick in the die has been attained the trip lever will be operated to pull the trip bar 170 downwardly, which will cause the cam block 169 to force the latch 165 out of engagement with the apertured flange 164. The spring 163 will immediately throw the trip plate 161 outwardly over the arm 29 so that as the said arm rises it will lift the cam member and produce the actuation of all the parts necessary for separating the stick, twisting the wires and cutting the same, as heretofore set forth. The arm 29 will, also, force the cam member downwardly again by its engagement with the abutment projection 160. As the cam member descends the trip block 169, which is beveled at its upper end, will be sprung to one side of the end of the latch 165. The trip piece 161 is returned to its latched position when the cam member reaches its highest point, by means of a spring pressed bar 177, which is mounted upon the bracket 128. Said spring pressed bar 177 forces the trip piece 161 inwardly until the latch 165 springs into the opening 166 for locking said trip piece in place.

In order to prevent the cam member from descending under the action of gravity and before the arm 29 positively depresses the same, a brake device is applied to the lower end of the bar 127, as clearly shown in Figs. 7 and 16. The said bar 127 passes between friction pieces 178 and 179 carried by parallel bars 180, which are secured to the lower portion of the machine frame. A bolt 181 connecting the free ends of said bars may be tightened to the proper degree for exerting enough pressure upon the said bar 127 to prevent its accidental movement, or any motion thereof except under the impulse of the arm 29.

The operation of the machine will be readily understood from the above description and need not be set forth with greater particularity at this point. A general reference to the operation will be sufficient in connection with said description. The machine is set in operation by the throwing of the clutch disk 34. The plunger 28 will thus be caused to continuously reciprocate. The particles to be compressed, as for instance saw-dust, shavings, chips, or the like, are fed into the hopper 21 and the plunger 28 continuously forces charges thereof into the die, and as the stick of material in the die lengthens under the action of the plunger 28 it will be forced between the wires 62 and 63 and will, also, turn the serrated wheel 73. When a stick of sufficient length has been produced, the wheel 73 will trip the lever 173 and cause the trip piece 161 to be thrown outwardly and into engagement with the arm 29. The principal cam member of the machine will thus be carried upwardly by the arm 29, the various cam surfaces of the member causing the descent of the twisting member for the separation of the stick of material, the bringing together of the clutch members for twisting the stick and the wires around it, the brake having been at the same time released, and further, the operation of the cutting mechanism for severing the twisted wire between the separated ends of the composite stick. The descent of the cam member that above described accomplishes the last portion of the wire cutting operation as above set forth. Upon the complete return of the cam member to its lowermost position, the twisting member will have been raised to its position adjacent to the die, the clutch members will have been separated and the band brake tightened to hold the cup member stationary and the cutting blades will have been retracted to their inoperative positions. The action of the parts is thus entirely automatic when the machine is running. The completed sticks with the wire twisted at both ends thereof will force each other out of the lower end of the twisting member in succession.

While the machine has been shown with only one compressing plunger and coöperating parts, it will be evident that by providing other cranks upon the main shaft, that other plungers may be used with their coöperating parts for doubling or further increasing the capacity of the machine, all within the spirit and scope of the invention.

What is claimed is:

1. A machine of the class described comprising a material compressing element, means for twisting and binding the materials compressed, thrust members for controlling the twisting and binding actions and a movable member coöperating with the compressing element for actuating the said thrust members.

2. A machine of the class described comprising a compressing member, a twisting member, mechanism for rotating the twisting member and a movable cam member coöperating with the compressing member for causing the actuation of the twisting mechanism.

3. A machine of the class described comprising a compressing member, a member for shaping the material operated upon by the compressing member, a material separating and twisting member and a cam member coöperating with the compressing member for causing the operation of the material separating and twisting member.

4. A mechanism of the class described comprising a reciprocating compressing member, means for shaping materials compressed thereby, means for separating and twisting a binder about the same, means for cutting the binder and a cam member coöperating with the compressing member for accomplishing the separating, binding and cutting operations.

5. A mechanism of the class described comprising a material compressing element, mechanism for separating the materials compressed into proper lengths, mechanism for fastening a binder about said separated material, mechanism for cutting the binding material, a single movable actuating member and independent means extending from each of the said mechanisms to said movable actuating member, to operate them in conjunction with the movement of the compressing element.

6. A mechanism of the class described comprising a material compressing element, a material separating member, means for securing a binder about the separated material, means for disconnecting the binding means from the mechanism, a reciprocating cam member coöperating with the material compressing member and a trip mechanism for bringing the said cam member into operation when the compressed material has attained the proper size.

7. A mechanism of the class described comprising a reciprocating material compressor, a die for shaping the materials compressed, means for separating the compressed materials into masses of a desired size and a reciprocating cam member adapted to be actuated by the reciprocating compressor for causing the operation of the separating member.

8. A mechanism of the class described comprising a compressing plunger, a material shaping die coöperating with said plunger, a material separating and twisting member adapted to receive the compressed material from the die, means for applying a binding wire about said separated material, means for twisting the separating member to twist the wire upon the separated material and a cam member for controlling, in accordance with the movement of the plunger, the operation of the other mechanism of the machine.

9. A mechanism of the class described having a reciprocating compressing plunger, a die for shaping the material compressed by said plunger, a separating member adapted to receive the material compressed from said die, means for separating the said latter member from the die, means for applying a binder about the material thus separated and a cam member coöperating with the plunger for causing the proper operation of the other parts of the machine.

10. A mechanism of the class described having a compressing plunger, a die adapted to form the material compressed into a composite stick, a twisting member arranged to receive the stick from the die, means for lowering the twisting member to separate the stick of material, gearing for twisting said member, means for actuating said gearing, means carried by the die for applying a binding means upon the compressed stick of material, means for cutting the binding material when the stick is separated and a cam adapted to be actuated by the compressing plunger for controlling the operations of the other material manipulating parts of the machine.

11. A machine of the class described having a material compressing plunger, an expansible die for receiving the materials compressed by the plunger, said die being formed with separable sections, means for normally holding said sections with relation to each other, means for receiving, separating and binding the material after it passes from the die, a controlling member for causing the separation of the material, a controlling member for causing the binding of the material and an actuating member common to said controlling members and operating in conjunction with the plunger for effecting and timing the operations of the machine with respect to said plunger.

12. A machine of the class described having a material compressing plunger, a die having separable sections, one of said sections being fixed in the machine while the other is adapted to rock with respect thereto, adjustable means for holding said rocking member whereby it may be released if the materials compressed in the die become wedged too tightly therein, means for applying wires to the materials forced through the die, means for receiving the material from the die and twisting the wires at the ends thereof, a cam member effecting said latter operation in coöperation with the movement of the plunger and a trip mechanism, carried by the die and operated by the compressed material forced therethrough, for controlling the times of operation of the said cam member.

13. A machine of the class described having a material compressing member, a die for receiving the same, said die having kerf forming blades therein, means for directing binding wires into said kerfs, wire engaging blades for forcing said wires into said kerfs, means for twisting the wires to fasten them upon the materials compressed and a cam member adapted to be moved by the compressing member for accomplishing the wire twisting operation.

14. A machine of the class described having a compressing member and means for actuating the same, a die for shaping the material compressed into an elongated stick, a twisting element adapted to receive the said stick, standards for supporting said twisting member, means for raising and lowering said standards, a cam member adapted to actuate said means and means for causing the operation of the cam member when the compressed stick has attained a given length.

15. A material compressing machine having a compressing plunger, a stick forming die coöperating with said plunger, a twisting member having yielding material receiving sections, a collar movably supporting said twisting member, rack bars for raising and lowering the twisting member, segments for actuating said bars, a thrust bar for controlling said segments and a cam member for actuating said thrust bar when the twisting member is to be lowered and raised again.

16. A material compressing machine having a compressing member, a material shaping die, a material separating and twisting member, a power shaft for actuating the twisting member, a clutch mechanism for connecting the twisting member with said power shaft, a member movable in correspondence with the action of the compressing member and means extending from said clutch mechanism into the path of said movable member for actuation in controlling said clutch mechanism.

17. A compressing machine having a material compressing member, a die, a twisting member, a power shaft for the twisting member having a clutch cone thereon, a clutch cup member coöperating therewith, gearing connecting the cup member with the twisting member, a brake for controlling the operation of the said cup member, a rocking member adapted to control the action of the said brake and the said cup member, and a cam member adapted to be operated by the compressing plunger for causing the movement of said rocking member.

18. A material compressing machine having a compressing member, a die, a twisting member, means for applying a wire binder upon the materials compressed before entering the twisting member, mechanism for operating the twisting member from the die, a thrust bar controlling said mechanism, mechanism for twisting said twisting member, a thrust bar for controlling the same, a wire cutter, a thrust bar for controlling the same, a reciprocating bar having cam surfaces thereon adapted to engage all of said thrust bars for actuating them in proper relation to each other, and means for causing the reciprocation of said bar in conjunction with the movement of the compressing member.

19. A material compressing machine having a material compressing plunger, an arm projecting therefrom, means for separating portions of the materials compressed and twisting a wire binder about the same, means for cutting the wire binder after it is twisted, a reciprocating bar having a latch adapted to engage the arm carried by the compressing member, a trip mechanism for causing the operation of said latch and cam surfaces carried by said bar for producing in coöperation with the movement of the compressing member, the other operations of the machine in proper timed relation to each other.

20. A material compressing machine having a compressing member, provided with an actuating arm, a die for shaping the materials compressed, a twisting member, means for applying wires about the materials compressed, means for raising and lowering the twisting member, a thrust bar controlling the same, means for twisting said member, a thrust bar controlling the same, wire cutting blades for separating the wire in proper lengths, a thrust bar controlling the same, a reciprocating rod having cam surfaces adapted to engage each of said thrust bars for causing their operation in properly timed relation to each other, a trip member carried by said bar and adapted to secure the same to the arm of the compressing member, means for moving said latch out of arm engaging position, means for locking said latch out of operative position, a trip rod adapted to unlock said latch when the parts controlled by the cam surfaces are to be brought into operation, a trip lever for actuating said trip rod and a serrated wheel having projections for engaging said trip lever when the same is to be actuated, said serrated wheel being arranged to engage the compressed material and to be turned thereby.

21. A material compressing machine having a compressing plunger, a forming die coöperating therewith, a material operating and twisting member, a power shaft for said twisting member, a clutch mechanism for connecting the twisting member with said power shaft, a rock shaft controlling said clutch member, an arm for actuating the same, a band brake for controlling the clutch member, a rocking member for controlling simultaneously the said clutch controlling shaft and the said band brake, a thrust rod for actuating said rocking member, a reciprocating cam adapted to force the thrust rod in one direction for releasing the clutch and setting the brake, a trip mechanism for throwing the thrust rod out of engagement with said cam member, a cam projection being provided on said cam member for operating said trip member and means for causing the reciprocation of the cam member by the compressing plunger.

22. A material compressing machine having a compressing plunger, a die having means for directing a wire binder into position upon the materials compressed, means for separating the materials into suitable lengths and twisting the wire about the same, knife blades for severing the twisting wire, one of said knife blades having a pin and slot connection with the frame of the machine and being pivoted to the other knife blade, the other knife blade being arranged to reciprocate in suitable guides, a thrust rod for reciprocating said blade whereby the blades will be caused to close upon each other with the action of shears in cutting the wire, a cam member engaging said thrust rod and means for causing the operation of the said cam member at proper intervals.

23. A material compressing machine having a compressing plunger and a shaping die, a twisting member for twisting wires applied about the material compressed, mechanism for twisting said member, mechanism for lowering and raising the said twisting member, a wire cutter, a cam member having cams formed thereon adapted to produce the operation of the mechanism for raising and lowering the twister, and also the operation of the mechanism for turning the twister and the mechanism for actuating the cutting knives, said cam member having a bar engaging bearings upon the machine, friction means for holding the said bar in its adjusted positions when not positively actuated and means for throwing the bar into engagement with the compressing plunger for causing its positive actuation at proper intervals.

24. A material compressing machine having a compressing plunger and a shaping die, means for placing wires about the materials compressed to bind the same, a wire cutting mechanism having a reciprocating blade, a pivoted blade coöperating therewith, and having pin and slot connections with the frame of the machine whereby the blades will come together upon the reciprocations of the first named blade and a cam member for reciprocating said blade.

In testimony whereof, I have hereunto set my hand, in presence of two witnesses.

GEO. C. HUMPHREY.

Witnesses:
CASSELL SEVERANCE,
E. LE CORNU.

Copies of this patent may be obtained for five cents each, by addressing the "Commissioner of Patents, Washington, D. C."